United States Patent
Shomura et al.

[15] 3,697,648
[45] Oct. 10, 1972

[54] ANTIBIOTIC SF-767-A AND SF767-L SUBSTANCES, AND PROCESS FOR PRODUCING SAME CULTURING A CERTAIN STREPTOMYCES MICROSPOREUS

[72] Inventors: Takashi Shomura; Norio Ezaki, both of Yokohama-shi; Takashi Tsuruoka; Tomizo Niwa, both of Kawasaki-shi; Eiichi Akita, Tokyo; Taro Niida, Yokohama-shi, all of Japan

[73] Assignee: Meiji Seika Kaisha, Ltd., Tokyo, Japan

[22] Filed: May 15, 1969

[21] Appl. No.: 824,885

[30] Foreign Application Priority Data

May 24, 1968 Japan ...................... 43/34716
June 28, 1968 Japan ...................... 43/44682

[52] U.S. Cl. .................. 424/118, 424/116, 195/80
[51] Int. Cl. ............................................. A61k 21/00
[58] Field of Search .................. 424/118, 117, 119

[56] References Cited

UNITED STATES PATENTS 3,018,220   1/1962   McGuire et al. ............ 424/118
3,131,126   4/1964   Gaeumann et al. ......... 424/118

Primary Examiner—Albert T. Meyers
Assistant Examiner—Daren M. Stephens
Attorney—Larson and Taylor

[57] ABSTRACT

This invention relates to new antibiotic substances having a broad antibacterial spectrum and called SF–767–A substance and SF–767–L substance, respectively and a method of producing them by culturing a micro-organism *Streptomyces microsporeus* identified as ATCC No. 21384.

7 Claims, 7 Drawing Figures

ANTIBIOTIC SF-767-A AND SF767-L SUBSTANCES, AND PROCESS FOR PRODUCING SAME CULTURING A CERTAIN STREPTOMYCES MICROSPOREUS

This invention relates to new and useful antibiotic substances called SF–767–A substance and SF–767–L substance, respectively, and to the production of these antibiotic substances.

We have found that new antibiotic substances which show a powerful growth-inhibitory action against a broad range of micro-organisms such as Gram-positive, Gram-negative pathogenic bacteria and acid-fast bacteria are produced in a culture broth of a specific strain which belongs to the genus Streptomyces, that such antibiotic substances may be recovered from the culture broth, and that one of these antibiotic substance is remarkably effective in inhibiting the growth of *Pseudomonas aeruginosa*. We have called these new substances SF–767–A substance and SF–767–L substance, respectively.

Both of the SF–767–A substance and the SF–767–L substance are effective in inhibiting the growth of Gram-positive, Gram-negative and mycobacteria as well as the growth of pathogenic bacteria which are resistant to the known antibiotics and synthetic chemotherapeutic agents. The SF–767–A and SF–767–L substances are substantially non-toxic and exhibit a therapeutic effect on the infections of Gram-positive, Gram-negative and acid-fast bacteria in human beings and animals.

According to a first aspect of the present invention, therefore, there is provided an antibiotic substance effective in inhibiting the growth of Gram-positive, Gram-negative bacteria and acid-fast bacteria, selected from the group consisting of SF–767–A substance and SF–767–L substance and acid addition salts, thereof each of the SF–767–A and SF–767–L substances being a substance which is soluble in water, sparingly to slightly soluble in methanol, and very slightly soluble to insoluble in ethanol, butanol, acetone, ethyl acetate, benzene, ethyl ether and n-hexane, which is basic and forms salts with acids, which exhibits no absorption maximum of ultraviolet light from 210 m$\mu$ to 360 m$\mu$, which gives a positive reaction to Molisch, anthrone and ninhydrin reagents but a negative reaction to Benedict, Fehling, Sakaguchi, ferric chloride, Elson-Morgan and maltol reagents, which contains only the elements carbon, hydrogen, nitrogen and oxygen, which contains amino group but no acidic group, which is dextro-rotatory in water, which gives a slight alkaline solution in water wherein the molecules of the substance migrate toward the cathode at pH 1.8 when tested in paper electrophoresis, and which exhibits the characteristics of the aminoglycosidic antibiotics in the infra-red absorption spectrum; the further properties of the SF–767–A substance being that the SF–767–A substance free base forms a white colored amorphous powder showing no sharp melting point but decomposing in the vicinity of 190° C with effervescence, gives an elementary analysis C 45.06%, H 7.40%, N 8.90% and O 39.08%, shows a molecular weight of 620 as determined by the vapor pressure equillibrium method in aqueous solution, hence has the empirical formula $C_{23}H_{44}NO_{15}$, exhibits an optical rotation of $[\alpha]_D^{25} + 67°$ in 1 percent aqueous solution and exhibits characteristic absorption bands in the infra-red region of spectrum when pelleted in the form of the free base in potassium bromide at the following wave numbers in cm$^{-1}$: 3,400, 2,900, 1,595, 1,460, 1,350, 1,130 (shoulder), and 1,010; and the further properties of the SF–767–767–L substance free base forms a white colored amorphous powder showing no sharp melting point but decomposing in the vicinity of 192°C with effervescence, gives an elementary analysis: C 43.58%, H 6.80%, N 8.62%, and O 40.75%, shows a molecular weight of 682 as determined by the vapor pressure equillibrium method in aqueous solution, hence has the empirical formula $C_{23}H_{46}NO_{16}$, exhibits an optical rotation of $[\alpha]_D^{25} + 69°$ in 1 percent aqueous solution and exhibits characteristic absorption bands in the infra-red region of spectrum when pelleted in the form of the free base in potassium bromide at the following wave numbers in cm$^{-1}$: 3,420, 2,910, 1,585, 1,480, 1,350, 1,130 (shoulder) and 1,010.

As the acid salts of the SF–767–A and SF–767–L substances there may be mentioned, for example, acid addition salts of these substances with non-toxic organic and inorganic acids such as hydrochloric acid, sulfuric acid, hydrobromic acid, hydriodic acid, phosphoric acid, nitric acid, acetic acid, citric acid, maleic acid, malic acid, tartaric acid, benzoic acid, cinnamic acid, ascorbic acid, glycolic acid and the like.

Referring to the attached drawings:

FIG. 7 shows thin layer chromatograms of the N-acetylates of the SF–767–A and SF–767–L substances and the N-acetylate of paromomycin I.

Figure 1:
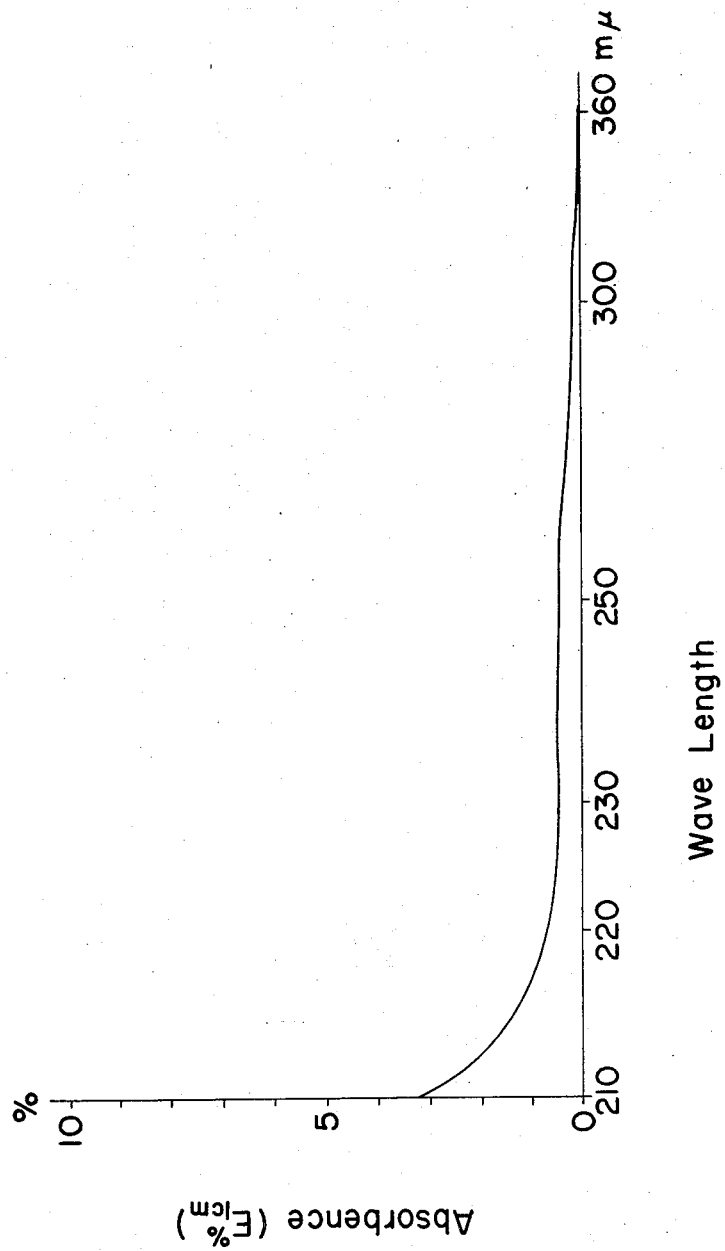
FIG. 1 shows a curve of the ultra-violet absorption spectrum of the SF–767–A substance in the form of the free base dissolved at a concentration of 1 percent in water.

We have found that both the SF–767–A and SF–767–fur and halogen.

We have found that the molecular weights of the SF–767–767–L substances are 620 and 682, respectively, as determined by the vapor pressure equilibrium method in the aqueous solution and that these figures may be supported by the values of 614 and 658, respectively (for the tetra-acid base) when estimated from the titration curves of the SF–767–A and SF–767–L substances.

The fact that the SF–767–A and SF–767–L substances both are basic substance containing no acidic group in their molecules have also been confirmed from the titration curves of these substances. It has been found that both the SF-767-A and SF-767-L substances are stable under the neutral or alkaline conditions but become slightly instable under an acidic condition.

When either of the SF-767-A and SF-767-L substances was subjected to descending paper chromatography, using various solvent systems (6:4:1:3) n-butanol-pyridine-acetic acid-water (development for 7 days); (15:10:3:12) n-propanol-pyridine-acetic acid-water (development for 20 hours) and water-saturated n-butanol containing 2 percent p-toluene sulfonic acid (development for 20 hours), respectively, then to coloration by the ninhydrin reaction and finally to bioautography with Bacillus subtilis, the SF-767-A substance gave a single spot at a distance of 6.1 cm., 11.4 cm., and 3.9 cm. from the original points, respectively with the above-mentioned different solvent systems. The SF-767-L substance then gave a single spot at a distance of 5.7 cm., 9.7 cm., and 2.5 cm. from the original point, respectively.

In the test of high voltage paper electrophoresis (3,000 voltages, at pH 1.8, for 20 minutes) we have found that both the SF-767-A and SF-767-L substances migrate over 11.5 cm. to the cathode and give a single spot, respectively.

In a thin layer chromatography with silica gel G (a product of Merk Co., U.S.A.), we have found that the N-acetylate of the SF-767-A substance or that of SF-767-L substance gives a single spot and that when the N-acetylate of the SF-767-A substance, the N-acetylate of SF-767-L substance and the N-acetylate of paromomycin I were developed simultaneously on the same plate, each of them gave a single spot with different Rf-values respectively. The ratios of the migration distances of the N-acetylated SF-767-A substance to that of the N-acetylated paromomycin I were 0.89 and 1.06 respectively when (2:1:1) t-butanol-acetic acid-water and (6:4:3) n-butanol-pyridine-water were used as the developing solvent. The ratios of the migration distance of the N-acetylated SF-767-L substance to that of the N-acetylated paromomycin I were 0.78 and 1.00, respectively, when (2:1:1) t-butanol-acetic acid-water and (6:4:3) n-butanol-pyridine-water were used as the developing solvent.

The antibacterial spectra of both the SF-767-A and SF-767-minimum inhibitory concentrations of these new antibiotics were determined by using the broth dilution method with various culture media as indicated in Table 1.

TABLE 1

| Test micro-organisms | SF-767-A substance Minimum inhibitory concentration (mcg/ml) | Culture medium used | SF-767-L substance Minimum inhibitory concentration (mcg/ml) | Culture medium used |
|---|---|---|---|---|
| Bacillus subtilis ATCC 6633 | 0.19 | Bouillon | 0.19 | Bouillon |
| Bacillus cereus IAM 1072 | 3.125 | Bouillon | — | — |
| Staphylococcus aureus 209-P | 1.56 | Bouillon | 3.125 | Bouillon |
| Staphylococcus aureus 209-P resistant to penicillin | 1.56 | Bouillon | — | — |
| Staphylococcus aureus 209-P resistant to streptomycin and A-249 substance | 3.125 | Bouillon | — | — |
| Staphylococcus aureus 209-P resistance to novobiocin | 0.78 | Bouillon | — | — |
| Staphylococcus aureus Smith | 0.19 | Bouillon | 0.39 | Bouillon |
| Staphylococcus aureus Terajima 34 | 0.19 | Bouillon | 0.19 | Bouillon |
| Staphylococcus aureus 52-34 | 0.78 | Bouillon | 1.56 | Bouillon |
| Staphylococcus aureus 52-34 resistant to tetracycline, erythromycin and carbomycin | 1.56 | Bouillon | 1.56 | Bouillon |
| Staphylococcus aureus 193 | 1.56 | Bouillon | 3.125 | Bouillon |
| Staphylococcus aureus resistant to streptomycin, erythromycin, tetracycline and penicillin | 0.78 | Bouillon | 6.25 | Bouillon |
| Staphylococcus aureus resistant to streptomycin, tetracycline and penicillin | 1.56 | Bouillon | — | — |
| Sarcina lutea | more than 100 | Bouillon | more than 100 | Bouillon |
| Lactobacillus arabinosus | 1.56 | Glucose, peptone, yeast extract | 25 | Glucose, peptone, yeast extract |
| Streptococcus faecalis | 50 | " | more than 100 | " |
| Escherichia coli IAM 1253 | 12.5 | Bouillon | 25 | Bouillon |
| Escherichia coil IAM 1239 | 12.5 | Bouillon | 12.5 | Bouillon |
| Escherichia coli K-12 | 3.125 | Bouillon | 12.5 | Bouillon |
| Escherichia coli resistant to chloramphenicol | 1.56 | Bouillon | 3.125 | Bouillon |
| Escherichia coli resistant to kanamycin | 50 | Bouillon | — | — |
| shigella dysenteriae | 6.25 | Bouillon | 6.25 | Bouillon |
| Shigella sonnei | 12.5 | Bouillon | 12.5 | Bouillon |
| Shigella flexneri resistant to tetracycline and streptomycin | 12.5 | Bouillon | 25 | Bouillon |
| Salmonella typhi | 3.125 | Bouillon | 6.25 | Bouillon |
| Salmonella paratyphi A | 3.125 | Bouillon | 6.25 | Bouillon |
| Salmonella paratyphi B | 3.125 | Bouillon | 6.25 | Bouillon |
| Klebsiella penumoniae | 3.125 | Bouillon | 3.125 | Bouillon |
| Proteus vulgaris | 12.5 | Bouillon | 25 | Bouillon |
| Pseudomonas aeruginosa (8063) | 6.25 | Bouillon | more than 100 | Bouillon |
| Pseudomonas aeruginosa (8152) | 3.125 | Bouillon | — | — |
| Xanthomonas oryzae | 1.56 | Bouillon | 3.125 | Bouillon |
| Mycobacterium smegmatis 607 | 0.78 | glycerine bouillon | 0.78 | glycerine bouillon |
| Mycobacterium smegmatis 607 resistant to streptomycin | 0.78 | " | 0.78 | " |
| Mycobacterium smegmatis 607 resistant to kanamycin | 25 | " | — | " |
| Mycobacterium phlei | 0.39 | " | 0.39 | " |
| Candida albicans | more than 100 | sabouraud | more than 100 | sabouraud |
| Cryptococcus enoformans | more than 100 | sabouraud | more than 100 | sabouraud |
| Saccharomyces cerevisiae | more than 100 | " | more than 100 | " |
| Torula utilis | more than 100 | " | more than 100 | " |
| Aspergillus niger | more than 100 | " | more than 100 | " |
| Penicillium chrysogenum | more than 100 | " | more than 100 | " |
| Trichophyton asteroides | more than 100 | " | more than 100 | " |

As it is clear from Table 1, both the SF-767-A substance and SF-767-L substance are wide-range antibiotical substances which have useful antibacterial activity against Gram-positive bacteria, Gram-negative bacteria and acid-fast bacteria. Both of them are of an excellent antibacterial activity but have no antifungal activity.

In particular, it is significant that the SF-767-A substance exhibits a very much high antibacterial activity against Pseudomonas and acid-fast bacteria. Antibacterial activity of SF-767-A substance against Pseudomonas is tabulated in Table 2 below, in comparison with those of some known water-soluble basic antibiotics of the dextro-rotatory nature.

TABLE 2

| Antibiotic substances tested | Minimum inhibitory concentration (mcg/ml) | |
|---|---|---|
| | Pseudomonas aeruginosa (a strain isolated from a patient) | Pseudomonas aeruginosa strain 8063 |
| SF-767-A substance | 3.125 | 6.25 |
| Kanamycin A | 25 | 25 |
| Kanamycin B | 12.5 | 25 |
| Neomycin | 3.125 | 6.25 |
| Paromomycin | 25 | 50 |
| Tenemycin (complex) | 1.56 | 3.125 |
| Gentamicin | 0.39 | 0.78 |

The antibacterial activity of SF-767-A substance against Pseudomonas aeruginosa is four to eight times higher than those of kanamycin A, kanamycin B, and paromomycin, and it is advantageous that the antibacterial activity of SF-767-A substance cannot be inactivated by serum. Accordingly SF-767-A substance provides an excellent medicine for treatment of Pseudomonas infections.

According to tests of acute toxicity by intravenous injection to mice, toxicity of both the SF-767-A substance and SF-767-L substance are very much low. Thus, $LD_{50}$ of SF-767-A substance sulfate (pH 7.0) is 170 to 230 mg/kg, and $LD_{50}$ of SF-767-L substance sulfate (pH 7.0) is 280 mg/kg. No abnormal progress were observed after the injection.

The therapeutical effect of the SF-767-L substance was tested for mice infected with Staphylococcus aureus Smith. This substance was intra-muscularly injected at six different dosages in a range of 100 mg/kg to 1 mg/kg. It was estimated that the SF-767-L substance showed a value of 10 mg/kg (6.3 to 16 mg/kg) for $ED_{50}$ as calculated according to Lichfiels-Wilcoxon method and that kanamycin A used as the control exhibited an $ED_{50}$ value of about 5 mg/kg.

According to a second aspect of the present invention, there is provided a process for the production of the SF-767-A substance and SF-767-L substance, which comprises cultivating a strain of Streptomyces microsporeus in a culture medium containing assimilable nitrogen and carbon sources under aerobic conditions to produce and accumulate the SF-767-A substance and SF-767-L substance in the culture, and then recovering these antibiotical substances from the culture. With the process of the present invention, there may be observed a tendency that the SF-767-A substance is produced over the earlier and later phases of the process while the SF-767-L substance is rather produced much in the later phase of the process.

The micro-organism which produces both the SF-767-767-L substances was isolated by the present inventors from a sample of soil collected in Oiehama, Kasaoka City, Okayama Prefecture, Japan and designated Streptomyces microsporeus which has been deposited in the American Type Culture Collection, Washington D.C. under ATCC No. 21384.

Streptomyces microsporeus has the following microbiological characteristics:

I. Morphological observation

1. Aerial mycelium: aerial mycelium is difficult to form on the general culture media used for classification but is slightly formed to produce open spiral in some restricted conditions such as, on soil extract agar and potato extract agar etc.

2. Spore: Spherical to short cylinderical in shape and 0.3–0.5 microns by 0.5–0.7 microns in size. The spore is characterized by its smaller size than the spores of the general streptomyces. The surface structure is smooth.

3. Liquid cultivation: Two phases of growth, namely "short rods" type growth and "mycelium" type growth appear in a single generation of this micro-organism according to the time of cultivation.

II. Characteristics on various culture media are shown in Table 3 below.

TABLE 3

| Culture medium | Growth | Aerial mycelium | soluble pigment |
|---|---|---|---|
| Sucrose-Czapek agar | Very much weak growth, colorless to cream colored | none | none |
| Glycerine-Czapek agar | Colonial growth, dark green colored | Scant, bluish grey colored | none |
| Kraninsky's glucose asparagine agar | Light brown to brown colored growth with greenish tinge | None or partly, greyish blue colored | none |
| Ushinky's glucose asparagine agar | Light brown colored, wrinkled growth with greenish tinge | None or partly, greyish white colored | none |
| Calcium malate agar | Colonial growth, the agar slant is greyish green colored in the upper part and brown colored in the lower part | none | none |
| Glycerine calcium malate agar | Navy to dark blue colored growth | scant, greyish blue colored | none |
| Starch synthetic agar | light brown colored growth | Very scant | none |
| Nutrient agar | good, lightly brown colored and wrinkled growth | Scant, white colored but partly blue colored | none |
| Glucose bouillon agar | Thick elevated, very much wrinkled and cracked growth, light brown and partly dark green colored | scant, greyish blue colored | none |
| Tyrosine agar | Brown colored growth penetrating deeply into the agar | Scant, white colored | dark pink colored |
| Potato infusion agar | Cream colored growth | Scant, white colored, with formation of spore | pink colored |
| Soil extract agar | Cream colored growth, with dark blue colored border | Scant, white colored, with formation of |

| | | | |
|---|---|---|---|
| Oat meal agar | Yellowish brown to light brown colored growth | Scant, white colored | |
| Gelatine agar (incubated at 20°C) | light brown colored growth | none | none |
| Potato plug | Elevated, wrinkled growth, olive colored red with brown tinge | Scant white and partly blue colored | none |
| Carrot plug | light brown colored growth | Scant, white colored | none |
| Skimmed milk (incubated at 37°C) | Ring growth, light brown colored, pH 8.0 | none | Bright brown colored |
| Egg (incubated at 37°C) | Light brown to brown colored, wrinkled growth | none | none |
| Löeffler coagulated serum (incubated at 37°C) | Greyish blue colored growth | Scant, bluish grey colored | none |
| Cellulose | No growth | — | — |

Note: The incubation temperature was 28°C. in general, unless stated otherwise.

(III) Pysiological properties:
Production of hydrogen sulfide :negative
Production of tyrosinase :negative
Production of nitrite :positive
Peptonization of skimmed milk :positive (strong)
Coagulation of skimmed milk :negative
Reaction of skimmed milk :change to a pH of 8
Hydrolysis of starch :positive (strong)
Liquefaction of gelatine :positive (weak)
Dissolution of Loeffler's coagulated serum :negative (IV) Utilization of carbon sources:
1. Utilize: glucose, galactose, fructose, maltose, lactose, raffinose, dextrin, starch, glycerine, sorbitol, mannitol, inositol, sodium acetate, sodium succinate, sodium citrate, mannose and paraffin.
2. Doubtful: arabinose and xylose.
3. Not utilize: rhamnose, sucrose, inulin, dulcitol, salicin and cellulose.

The above-mentioned microbiological characteristics of the SF–767–A and SF–767–L substance-producing strain hereinafter, merely called SF–767 strain may be summarized as follows:

i. Aerial mycelium is scant, and the spore which may be formed under specific conditions is smaller in size. There appear two phases of growth during the incubation which is made in liquid culture medium, that is, "short rods" type growth occurs in the earlier stage of incubation, while "mycelium" type growth occurs in the middle and later stages of incubation.

ii. The growth in synthetic culture media is usually brown to greenish blue colored and is lack of soluble pigment.

iii. The growth in organic culture media is usually brown colored and often with bluish green tinge. Soluble pigment is generally absent, but in a rare case bright pink colored soluble pigment is produced on potato extract agar medium.

The SF–767 strain is characterized in that the aerial mycelium is scant on the agar media, that the short rods type growth is shown when incubated in liquid culture media and that paraffin is utilizable as the source of carbon. These properties of the SF–767 strain are partly related to those of the genus Nocardia. In view of the further characteristics of the SN–767 strain that the aerial mycelium grows well in potato extract agar and soil extract agar etc. to produce many chains of spores in a spiral form, and that the normal "mycelium" type growth is shown in the middle and later stages of incubation even when incubated in the liquid culture media, however, it is very right to consider that the SN–767 strain belongs to the genus Streptomyces. As such strains of Streptomyces which have the properties of the genus Nocardia and of the genus Streptomyces in a blending way, there may be mentioned *Streptomyces limosus, Streptomyces autotrophicus, Streptomyces gardneri, Streptomyces venezuelae, Streptomyces kanamyceticus* (the properties of the above cited strains are all based on Waksman's "The Actinomycetes" Vol. 2, 1961 unless stated otherwise), *Streptomyces varius* (Scientific Reports of Meiji Seika, No. 8, pages 30–39, 1966) and *Streptomyces chrestomyceticus* (Giorn. Microbiol. Vol. 7, pages 242–250, 1959), etc. Many of these strains show the division phenomenon of mycelium like the genus Nocardia, but all of these strains do not produce the spiral on the aerial mycelium, so that they are clearly morphologically differentiated from the SF–767 strain.

With Nocardia and Nocardia-like-Streptomyces, the division phenomenon takes place principally after the vegetative mycelium has been formed. But the SF–767 strain is essentially different from them in that the SF–767 strain rather shows the bacillary growth (which is deemed as a state of the sprouting courses) at the earlier period of incubation and becomes the mycelium form at the middle and later periods of incubation. From the foregoing, it is clear that the SF–767 strain is a unique and new strain which cannot be found among the known strains which are belonging to the "boundary region" between the genus Nocardia and the genus Streptomyces. Since the SF–767 strain has the above-mentioned position in the classification, the differentiation between the SF–767 strain and the general known strains of Streptomyces is somewhat obvious. Apart from the special limit of the "boundary region," the SF–767 strain is now compared to the known strains of Streptomyces in a way, mainly with respect to coloration of aerial mycelium and growth. The growth of the SF–767 strain has the green color or tinge in many culture media, and in this respect the SF–767 strain has a relationship to viridis series of the genus Streptomyces. Among this series, *Streptomyces alboviridis* and *Streptomyces intermedius* closely relate to the SF–767 strain, but these two strains are distinguishable from the SF–767 strains in that *Streptomyces alboviridis* do not produce spiral and shows good growth on cellulose medium and in that *Streptomyces intermedius* forms aerial mycelium with green color, darkens potato plug and produces yellow colored soluble pigment on glucose asparagine agar medium.

In view of that the SF–767 strain forms aerial mycelium of greyish blue color and produces soluble pigment of pink color in the potato infusion agar medium, the SF–767 strain may be considered to relate to violaceoruber series of the genus Streptomyces. Among this series, there may thus be mentioned *Streptomyces violaceoruber, Streptomyces caeruleus,* and *Streptomyces cyaneus,* etc. These strains of the violaceoruber series produce soluble pigment even in the synthetic culture media, and the soluble pigment changes from red to blue in color according to values of pH. The SF–767 strain does not produce soluble pigment in the synthetic culture media, and the soluble pigment of pink color which is produced on the potato extract agar medium does not change in coloration according to pH. Therefore, the SF–767 strain is different from the violaceoruber series, too.

In view of that the SF–767 strain is negative to melanin and shows scant formation of aerial mycelium in general, Streptomyces alboflavus and Streptomyces armillatus may be mentioned as the closely related species. Among these species, Streptomyces alboflavus forms powdery aerial mycelium of white color on sucrose Czapek agar medium, and the growth on glucose asparagine agar medium is yellow colored and does not exhibit blue to green color or tinge as the SF–767 strain do. Streptomyces armillatus shows the growth of yellow to orange color and therefore is differentiated from the SF–767 strain.

As mentioned above, no strain having the same properties as the SF–767 strain can be found among the known strains of Streptomyces which have been reported highertobefore.

On the other hand, the new antibiotics SF–767–A substance and SF–767–L substance which may be produced by the SF–767 strain are typical of water-soluble and basic antibiotics which have a broad antibacterial spectrum, and their optical rotation is (+). Among the known antibiotics, neomycin, kanamycin, paromomycin, gentamicin and tenamycin etc. belong to the same group of antibiotics. It is therefore necessary that the microbiological properties of the SF–767 strain should be compared to those of the micro-organisms which produce these known antibiotics.

First of all, as the gentamicin-producing micro-organism, there may be mentioned two strains, that is, *Micromonospora echinospora* and *Micromonospora purpurea* (see U.S. Pat. No. 3,091,572 issued in 1963) which may obviously be differentiated from the SF–767 strain as they belong to the different genus from Streptomyces.

Second, the kanamycin-producing organism *Streptomyces kanamyceticus*, the neomycin-producing organism *Streptomyces fradiae*, the paromomycin (or hydroxymycin)-producing organism *Streptomyces paucisporogenes* (Ann. pharm. franc. Vol. 16, page 585, 1958), and the paromomycin (or amminosidin)-producing organism Streptomyces chrestomyceticus (Giorn. Microbiol. Vol. 7, pages 242–250, 1959) do not form spiral, and the neomycin-producing organism *Streptomyces albogriseolus* produces hairy spore. In these respect, these strains are clearly different morphologically from the SF–767 strain. Among these species, *Streptomyces chrestomyceticus* closely relates to the SF–767 strain in that the former shows the fission of mycelium and that the spore is smaller in size. However, the SF–767 strain does not show the division of mycelium on agar medium and therefore may essentially be differentiated from *Streptomyces chrestomyceticus* in respect of the above-mentioned fission of mycelium. In addition, *Streptomyces chrestomyceticus* shows colorless to light yellow colored growth but does not produce soluble pigment of pink color on the potato extract agar medium, and it is clearly different from the SF–767 strain.

The paromomycin-producing organism *Streptomyces rimosus* forma paromomycinus (Japanese Patent Sho-33-6649), the paromomycin (or Zygomycin)-producing organism Streptomyces pluveraceus (Agr. Biol. Chem. Vol. 25, pages 171–175, 1961), the paromomycin (or catenulin)-producing organism *Streptomyces catenulae* and the tenemycin-producing organism *Streptomyces tenebrarius* (7th Interscience on Antimicrobial Agents and Chemotherpy held in Chicago City on 25th to 27th October, 1967) all produce spiral, and thus they relate to the SF–767 strain morphologically.

Among these species, however, *Streptomyces rimosus forma paromomycinus* forms aerial mycelium of white color on calcium malate agar medium, and on any culture medium it does not exhibit the green to greyish blue color which is observed in the growth and aerial mycelium of the SF–767 strain. Thus, it is differentiated from the SF–767 strain.

*Streptomyces pluveraceus* produces soluble pigment of brown to black color on glucose bouillon agar medium and on potato plug, and it shows colorless growth on Löeffler's coagulates serum. In these respects, it is clearly differentiated from the SF–767 strain. Streptomyces catenulae shows a formation of cluster, produces aerial mycelium of grey color on sucrose Czapek agar medium and calcium malate agar medium but does not reduce nitrate, and in these respects it is clearly different from the SF–767 strain.

*Streptomyces tenebrarius* shows yellow to orange colored growth and good formation of spore on synthetic culture media, coagulates skimmed milk but does not utilize raffinose, and in these and other respects it may be differentiated from the SF–767 strain.

As a result of the above-mentioned microbiological comparisons, we have confirmed that the SF–767 strain is new as one of the strains which produce water-soluble, basic antibiotic substances and that the SF–767 strain is a novel species from the viewpoint of taxonomy. Thus, we have designated this SF–767 strain as *Streptomyces microsporeus* nov. sp.

The properties of the SF–767 strain are liable to vary as may normally be observed with the other Streptomyces. Thus, the SF–767 strain may produce variants and mutants by treating with various known mutagens such as, ultra-violet rays, X-rays, high frequency electromagnetic waves, radioactive rays and chemicals, etc. All natural and artifical variants and mutants of the SF–767 strain may therefore be used in the process of the present invention as long as they have the ability to produce the SF–767–A substance and SF–767–L substance.

According to the process of the present invention, the SF–767 strain may be cultivated in a culture medium containing the nutrients which may be utilized by usual micro-organisms. As the nutrient sources, any of the known nutrients which have been used in cultivation of Streptomyces may be used. For example, glucose, starch, glycerine, dextrin, sucrose and the like are useful as the carbon sources. Soybean meal, wheat-embryo, meat-extract, peptone, dried yeast, corn steep liquor, distiller's soluble, ammonium sulfate, sodium nitrate and the like are useful as the nitrogen sources. If necessary, inorganic salts such as calcium carbonate, sodium chloride, potassium chloride, phosphates and the like may be added to the culture medium. In addition, such organic and inorganic materials which aid the growth of the SF–767 strain and promote the production of the SF–767–A substance and SF–767–L substance can also be added to the culture medium. As the method for cultivation of the SF–767 strain, liquid cultivation and particularly liquid cultivation under submerged aerobic conditions is most preferable like to the general processes for the production of the known antibiotics. The cultivation should be effected under aerobic conditions and suitable fermentation temperature is in a range of 25° to 35°C. For the production of the SF–767–A substance, it is often preferred to use a fermentation temperature of 28°C. and in the vicinity thereof. For the production of the SF–767–L substance, it is preferred to employ a fermentation temperature of 30° C. and in the vicinity thereof. Under these fermentation conditions, the concentrations of the SF–767–A substance and SF–767–L substance in the fermentation broth reach a maximum at the end of 2 to 5 days of fermentation in either of shaking cultivation method and tank cultivation method.

For assaying the SF–767–A substance or SF–767–L substance, the mycine-assay agar (pH 7.8) may be used as the medium, and Bacillus subtilis ATCC No. 6633 may be used as a test micro-organism. In assaying the SF–767—767–L substance with
Bacillus subtilis ATCC No. 6633 as the test micro-organism and the mykin-assay agar, it has been observed that the relation between logarithm of the concentrations of the SF–767–A substance or SF–767–L substance and the diameters of inhibitory ring against the test micro-organism is linear at the levels of 1 to 25 mcg/ml. Under such levels, the values of diameter of the inhibitory ring are 13 to 23 mm., respectively with the SF–767–A substance; and 12 to 22 mm., respectively with the SF–767–L substance (according to the cup-plate method).

The SF–767–A and SF–767–L substances are water-soluble, basic substances as will be clear from their physico-chemical properties as stated hereinbefore, and they may be recovered from the culture broth by any of the known methods which are generally available for the recovery of the known water-soluble, basic antibiotics such as kanamycin, neomycin etc.

For recovery of SF–767–A and SF–767–L substances from the fermentation broth, active carbon may be used as absorbent. SF–767–A and SF–767–L substances may be absorbed by active carbon more easily at an alkaline side. When they are desorbed from the carbon, it is more efficient to carry out the desorption at an acidic side, using water, aqueous alcohols or aqueous acetone.

The SF–767–A and SF–767–L substances may be purified using an ion-exchange resin as absorbent. For available ion-exchange resins, for example cation-exchange resins such as Amberlite IRC 50 (a product of Rohm & Haas, Co., U.S.A.) in $HN_4^+$ type, $Na^+$ type or $H^+$ type may be used with advantage. The elution may usually be carried out using an aqueous solution of acid, alkali or salt.

Further, the SF–767–A and SF–767–L substances may also be recovered efficiently by adding a water-miscible organic solvent to an aqueous solution containing the SF–767–A substance or its acid addition salt and/or SF–767–L substance or its acid addition salt to deposit the active substances in the form of the acid addition salt or free base.

A crude powder of the SF–767–A substance and/or SF–767–L substance thus obtained may further be purified by ion-exchange chromatography with $NH_4^+$-type Amberlite CG 50 (a product of Rohm & Haas Co., U.S.A.) or $OH^-$-type Dowex 1 × 2 (a product of Dow Chemical Co., U.S.A.).

When the SF–767 strain, that is, Streptomyces microsporeus is cultivated in a culture medium according to the process of the present invention, the SF–767–A substance and the SF–767–L substance are concurrently be produced and accumulated in the culture broth. As described hereinbefore, the SF–767–A substance has physico-chemical properties closely resemble to those of the SF–767–L substance, so that they may be recovered together from the culture broth by means of absorption with active carbon or suitable cation-exchange resins or by means of deposition with water-miscible organic solvents.

Once a solution or crude powder containing both the SF–767—767–L substances has been obtained, the SF–767–A substance may be isolated from the SF–767–L substance by utilizing the known procedure of ion-exchange chromatography with a cation-exchange resin such as $NH_4^+$-type Amberlite CG 50 (a product of Rohm & Haas Co., U.S.A.) or $OH^-$-type Dowex 1 × 2 (a product of Dow Chemical Co., U.S.A.), for example.

As is clear from the above explanation, the SF–767–A and SF–767–L substances are ones of water-soluble, basic antibiotics, and they are dextro-rotatory. Among the known antibiotics which are to be compared with the SF–767–A and SF–767–L substances, therefore, neomycin, paromomycin, kanamycin, gentamicin, tenemycin and actinospectacin etc., may be mentioned. For comparison of these known antibiotics with the SF–767–A and SF–767–L substances, their optical rotations are tabulated in Table 4 below, and their paper chromatographies are shown in Table 5 hereinafter.

TABLE 4

| Names of substance | Specific optical rotation $[\alpha]_D^{25}$ (in aqueous solution) | | Literatures |
|---|---|---|---|
| | free base | N-acetylate | |
| SF-767-A substance | +67° | +60° | |
| SF-767-L substance | +69° | +60° | |
| Neomycin A | +123° | | Umezawa et al; Index of Antibiotics from Actinomycetes (University of Tokyo Press and University Park Press state College, Pennsylvania, 1967) page 453 |
| Neomycin B | +58° | | " "page 454 |
| Neomycin C | +82° | | " "page 455 |
| Paromomycin I | +64° | | " "page 492 |
| Paromomycin II | +78° | | " "page 492 |
| Kanamycin A | +121° | | Kondo: Journal of Antibiotics series B, page 262, 1961 |
| Kanamycin B | +135° | | " " |
| Kanamycin C | +126° | | " " |
| Gentamicin A | +146° | | Umezawa et al; Index of Antibiotics from |

| | | | |
|---|---|---|---|
| Gentamicin $C_1$ | +158° | | Actinomycetes (University of Tokyo Press and University Park Press State College, Pennsylvania, 1967) page 308 |
| Gentamicin $C_2$ | +160° | | " "page 308 |
| Tenemycin 2 | | +130° | Seventh Interscience Conference on Antimicrobial agent and chemotherapy, held on 25th–27th October, 1967, in Chicago City, U.S.A. |
| Tenemycin 4 | | +109° | " " |
| Tenemycin 5 | | +107° | " " |
| Tenemycin 6 | | +95° | " " |
| Actinospectacin | +7.6° | | Umezawa et al; Index of Antibiotics from Actinomycetes (University of Tokyo Press and University Park Press State College, Pennsylvania, 1967 Page 105 |
| Kasugamycin | +120° | | " "page 365 |
| Capreomycin II | +2.5° | | " "page 192 |
| Destomycin A | +7° | | " "page 250 |
| Hygromycin B | +19.2° | | " "page 335 |

TABLE 5

| Names of substance | Solvent A* migration distance from original point in cm | ** $R_{767-L}$ | Solvent B* migration distance from original point in cm | ** $R_{767-L}$ | Solvent C* migration distance from original point in cm | ** $R_{767-L}$ |
|---|---|---|---|---|---|---|
| SF-767-A substance | 3.1 | 1.00 | 10.9 | 1.00 | 6.9 | 1.13 |
| SF-767-L substance | 2.5 | 1.00 | 9.7 | 1.00 | 5.7 | 1.00 |
| Neomycin A | 11.1 | 3.70 | 13.2 | 1.45 | 17.3 | 2.75 |
| Neomycin B | 7.7 | 3.50 | 10.6 | 1.00 | 7.4 | 1.00 |
| Neomycin C | 7.8 | 3.50 | 10.7 | 1.00 | 7.5 | 1.00 |
| Paromomycin I | 5.6 | 2.33 | 11.4 | 1.25 | 9.1 | 1.60 |
| Paromomycin II | 5.7 | 2.33 | 11.3 | 1.25 | 9.0 | 1.60 |
| Gentamicin C | 15.6 | 8.67 | 17.3 | 1.98 | — | — |
| Tenemycin mixture | (two spots) 9.0 | (two spots) 4.29 | 10.9 (single spot) | 1.20 (single spot) | 8.1 9.9 | 1.45 1.77 |
| Kanamycin A | 4.7 | 1.74 | 13.5 | 1.39 | 13.1 | 2.22 |
| Kanamycin B | 9.0 | 2.90 | 12.4 | 1.29 | 11.3 | 1.98 |
| Kanamycin C | 7.3 | 2.43 | 15.8 | 1.65 | 18.2 | 3.19 |

In Table 5,

* Solvent A consisted of n-butanol which was saturated with water containing 2% p-toluenesulfonic acid; this solvent was used in descending paper chromatography, development for 20 hours.
* Solvent B consisted of (15:10:3:12) n-propanol pyridine-acetic acid-water; this solvent was used in descending paper chromatography, development for 20 hours.
* Solvent C consisted of (6:4:1:3) n-butanol-pyridine-acetic acid-water; this solvent was used in descending paper chromatography, development for 7 days.
** $R_{767-L}$: This term represented the ratio of the value for migration distance of one antibiotic substance to the value for migration distance of the SF-767-L substance. In determination of $R_{767-L}$, an amount of the SF-767-L substance was added as an internal standard to each of the antibiotic substance, and the mixture was then developed.

Figure 3:
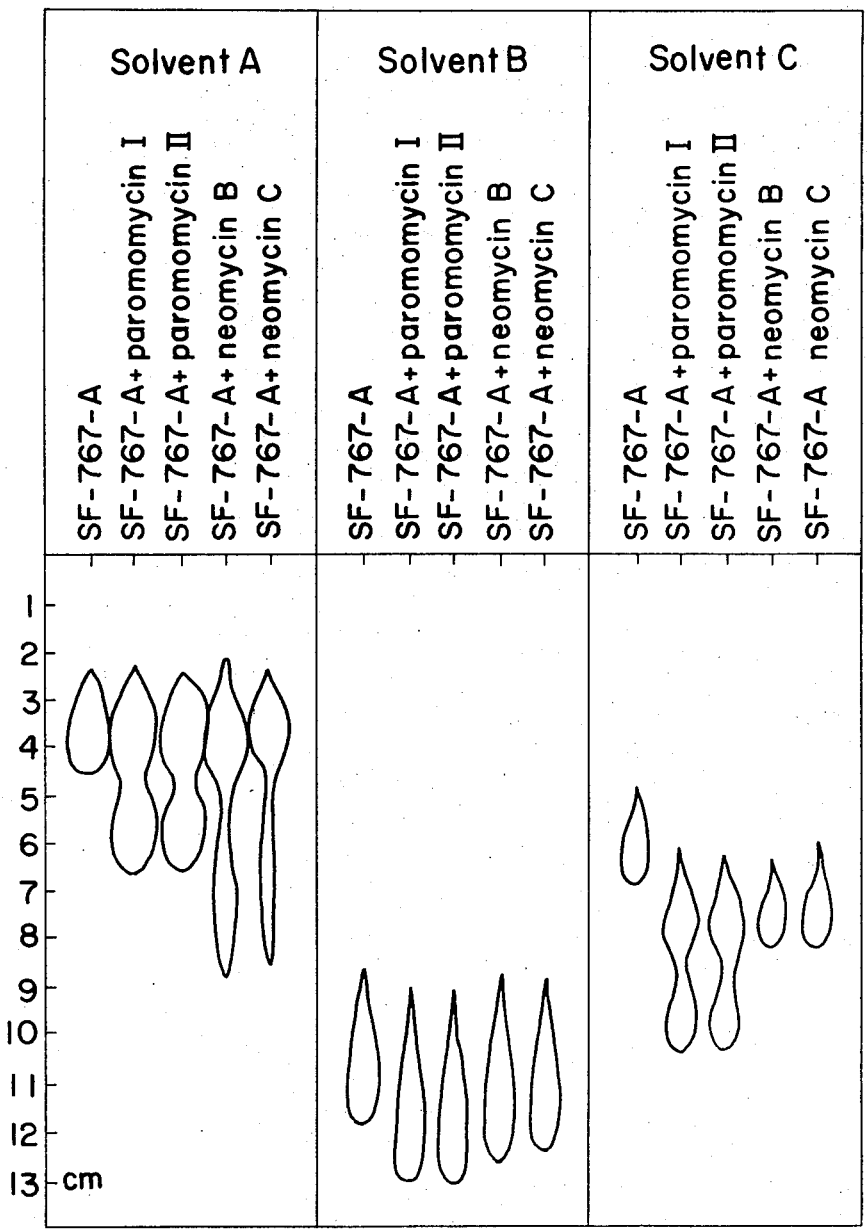
FIG. 3 shows paper chromatograms of the SF–767–A substance and its related antibiotics.
Figure 4:
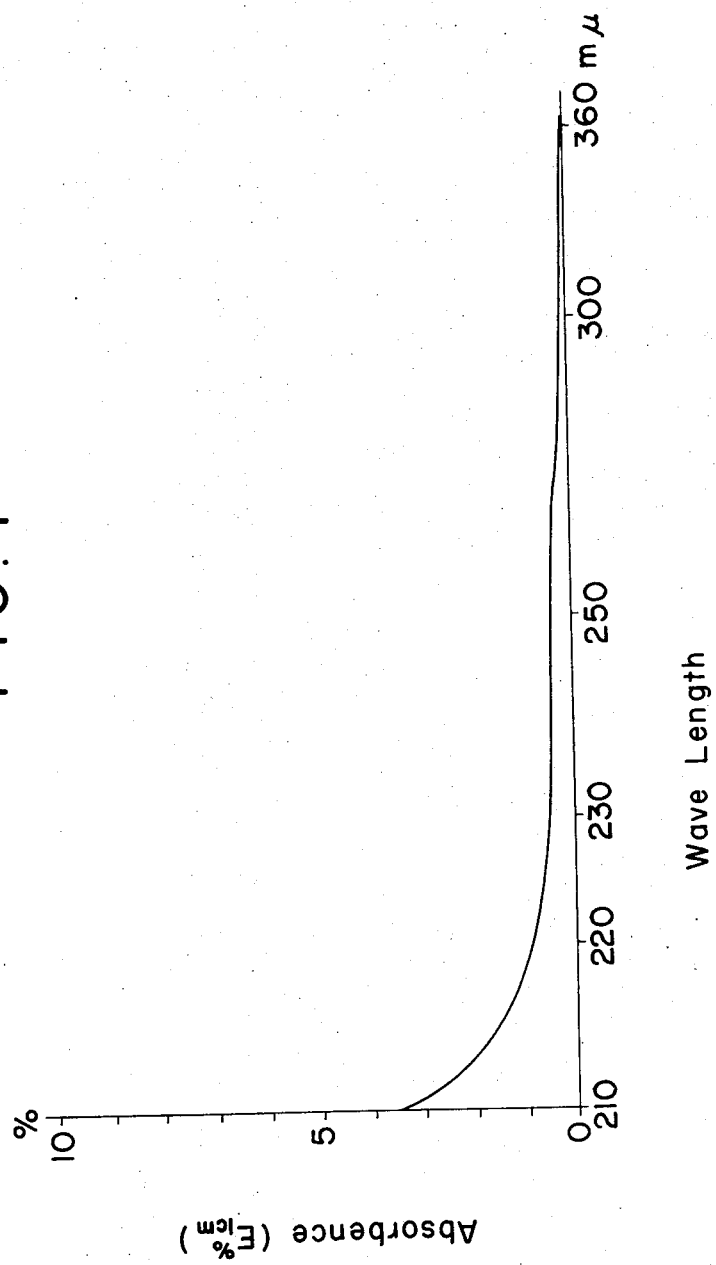
FIG. 4 shows a curve of the ultra-violet absorption spectrum of the SF–767–L substance in the form of the free base dissolved at a concentration of 1 percent in water.
Figure 6:
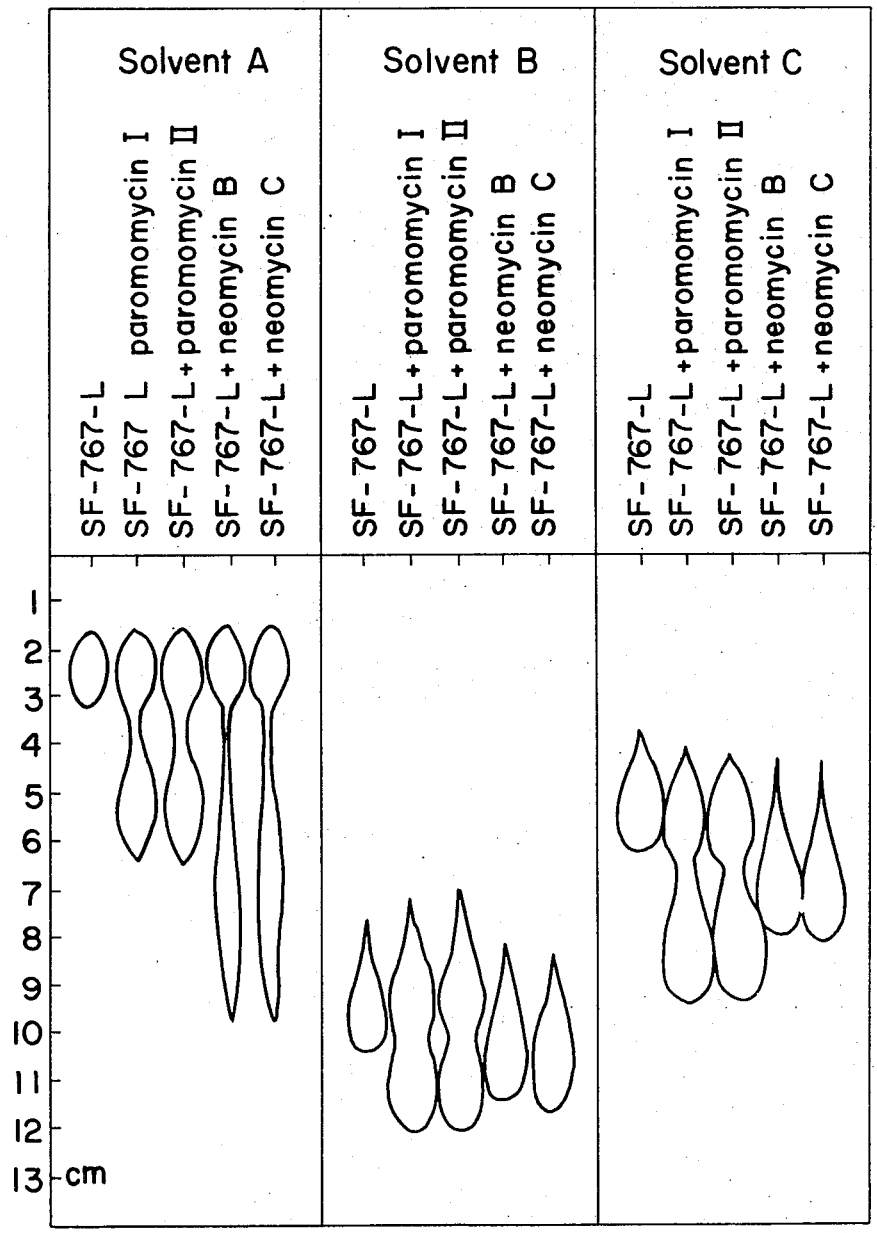
FIG. 6 shows paper chromatograms of the SF–767–L substance and it related antibiotics.

The SF-767-A substance was subjected to paper chromatography, either alone or in mixture with paromomycin I, paromomycin II and neomycin, respectively, using the solvent A, solvent B, and solvent C as mentioned above. The resulting chromatograms are shown in FIG. 3. The SF-767-L substance was also subjected to paper chromatography in the same manner as mentioned above. The resulting chromatograms are shown in FIG. 6.

In comparison of the specific rotations as tabulated in Table 4, it is apparent that the SF-767-A and SF-767-L substances are differentiated from kanamycine group (A, B, and C), neomycin A, gentamicin group (A, $C_1$, and $C_2$), tenemycin group (2, 4, 5, and 6), actino-spectacin, kasugamycin, capreomycin II, destomycin A and hygromycin B, respectively. In comparison of the mobilities on paper chromatography as shown in Table 5 and FIGS. 3 and 6, it is clear that the SF-767-and SF-767-L substances are differentiated from any of kanamycin group, tenemycin group, gentamicin group, paromomycins I and II as well as neomycin group. Moreover, the SF-767-A and SF-767-L substances may clearly be differentiated from kasugamycin, destomycin A and hygromycin B, respectively, in view of the aforesaid toxicity and characteristics of antibacterial spectra of the SF-767-A and SF-767-L substances. Furthermore, the SF-767-A and SF-767-L substances may be distinguished from capreomycin II in that the latter shows a maximum absorption in the ultra-violet absorption spectrum.

Figure 7:
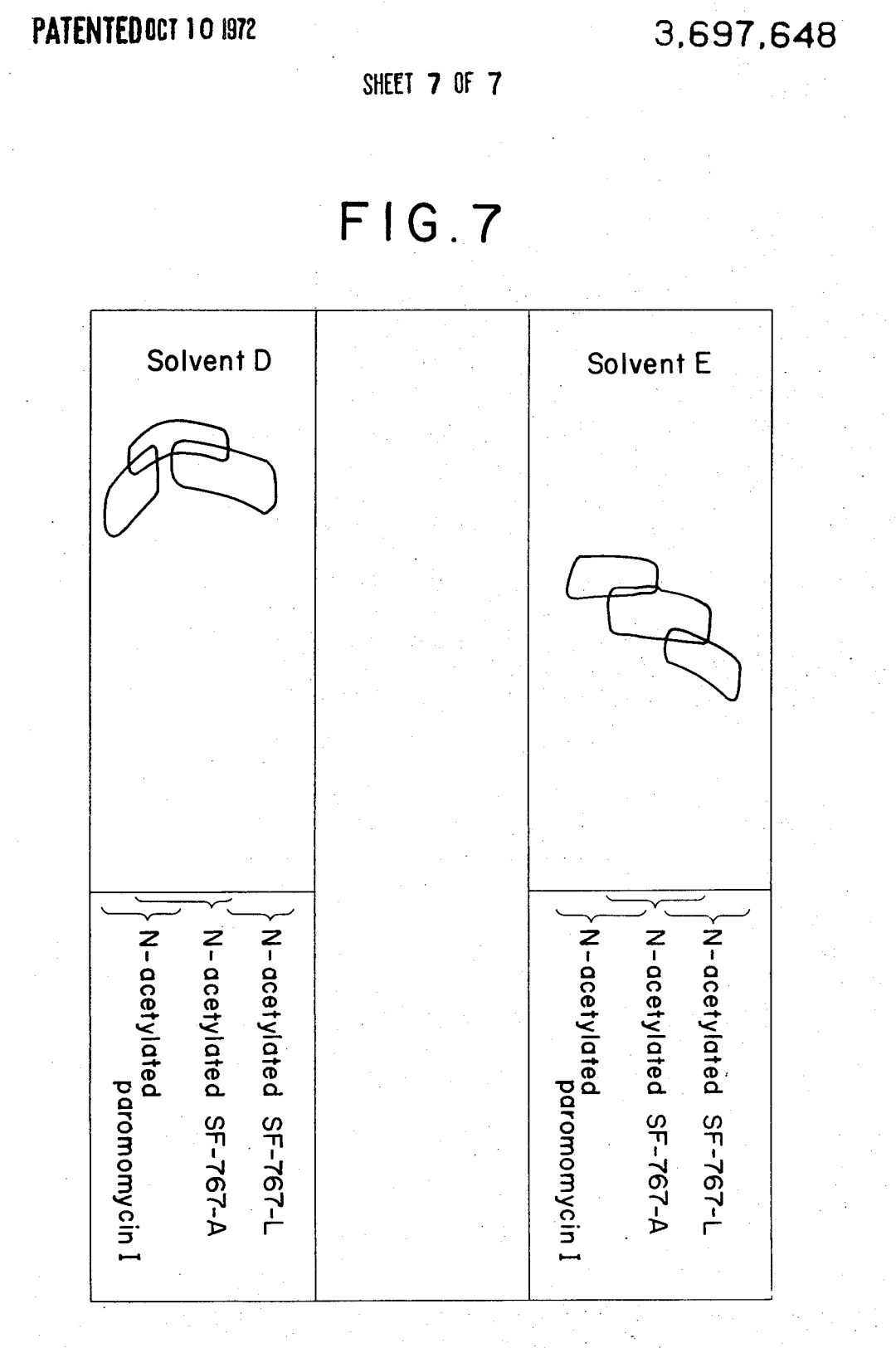

The SF-767-A substance may be differentiated from the SF-767-L substance in view of their different behaviors in ion-exchange chromatography and in thin layer chromatography with silica gel. Thus, the N-acetylate of the SF-767-A substance, the N-acetylate of the SF-767-L substance and the N-acetylate of paromomycin I were compared with each other by subjecting them to a thin layer chromatography with Silica Gel G. The results obtained are tabulated in Table 6, and the resulting chromatograms are shown in FIG. 7. Coloration of the chromatograms was made using 10 percent sulfuric acid with application of heat.

TABLE 6

| Name of substance | Solvent D* migration distance from original point (in cm) | ** $R_{paromo}$ | Solvent E* migration distance from original point (in cm) | ** $R_{paromo}$ |
|---|---|---|---|---|
| N-acetylated paromomycin I | 10.3 | 1.00 | 8.0 | 1.00 |
| N-acetylated SF-767-A substance | 11.0 | 1.06 | 7.2 | 0.89 |
| N-acetylated SF-767-L substance | 10.6 | 1.00 | 6.1 | 0.78 |

Referring to Table 7 and FIG. 7:

* Solvent D consisted of (6:4:3); n-butanol-pyridin-water; this solvent was used in ascending chromatography, development for 15 hours.
* Solvent E consisted of (2:1:1) tert-butanol-acetic acid-water; this solvent was used in ascending chromatography, development for 15 hours.
** $R_{paromo}$: this term represents the ratio of the value for migration distance of one antibiotic substance to the value of migration distance of N-acetylated paromomycin I.

In the thin layer chromatography, each of the antibiotic substances was spotted on a line in such a way that the spots of them partly overlapped with each other as shown in FIG. 7 and so that the N-acetylated paromomycin served as an internal standard.

In the preparation of the N-acetylates of the above-mentioned antibiotic substances, the acetylation was carried out by suspending the antibiotic substance in methanol, dissolving the substance at room temperature with addition of a sufficient amount of acetic anhydride, allowing the reaction solution to stand at room temperature for 20 hours and then adding ether thereto deposit the N-acetylated product.

As be clear from the above-mentioned comparisons, the SF–767–A substance and SF–767–L substance may be recognized as new antibiotic substances which do not coincide with any of the known antibiotics.

The present invention is now illustrated in the following Examples to which the present invention is not limited in any way.

EXAMPLE 1

The SF–767 strain, namely *Streptomyces Microsporeus* was inoculated to 15 l. of a liquid culture medium containing 2.0% starch, 2.5% soybean meal, 1.0% wheat-germ and 0.25% sodium chloride at pH 7 and stirr-cultured in a jar-fermenter at 28°C. for 3 days with aeration. The culture broth was filtered at pH 3 and the filter cake was washed with water. The washing water was combined to the filtrate to give 15 l. of a solution (potency, 30 mcg/ml). The solution was then adjusted to pH 7 with addition of sodium hydroxide, and then passed through a column containing 1.5 l. of Amberlite IRC 50 ($NH_4^+$ type), so that the active substances were adsorbed onto the ion-exchange resin. The resin was rinsed with 30 l. of water and then eluted with 0.5 N aqueous ammonia. The first running fraction (2 l.) of eluate was discarded, and 1 l. of the subsequent fraction of eluate was collected and concentrated to 100 ml. by evaporation under reduced pressure. The resulting concentrate was adjusted to pH 7 with addition of hydrochloric acid, and the precipitate formed was filtered off. The filtrate containing the active substances was passed downward through a column containing 70 ml. of Amberlite CG 50 ($NH_4^+$ type), and the column was washed successively with 140 ml. of water and with 600 ml. of 0.05 N aqueous ammonia. Thereafter, the active substances were eluted from the column using 0.1 N aqueous ammonia. About 2 l. of the eluate so obtained was then evaporated to dryness under reduced pressure to yield 60 mg. of a crude, white powder containing the SF–767–A substance and SF–767–L substance.

EXAMPLE 2

The SF–767 strain namely, *Streptomyces microsporeus* was inoculated to 40 l. of a liquid culture medium containing 3.5% saccharified starch, 4.0% soluble vegetable protein, 0.5% ammonium sulfate, 0.4% potassium chloride, 0.02% dipotassium phosphate and 0.8% calcium carbonate at pH 7.0, and then stir-cultured in a jar-fermenter at 30°C. for 5 days with aeration. The fermented broth was filtered at pH 7 and the filter cake was washed with water. The washing water was combined to the filtrate to give 36 l. of a solution (potency, 100 mcg/ml). This solution was passed through a column containing 4.5 l. of Amberlite IRC 50 ($NH_4^+$ type) to make the active substances adsorbed by the ion-exchange resin, which was then washed with 40 l. of water and elute using 0.5 N aqueous ammonia. The first running fraction (6 l.) of eluate was discarded and 3 l. of the subsequently running fraction of eluate was concentrated to 300 ml. by evaporation under reduced pressure. The resulting concentrate was adjusted to pH 7 with addition of hydrochloric acid, and the precipitate formed was filtered off. The filtrate containing the active substances was passed downward through a column containing 300 ml. of Amberlite CG 50 ($NH_4^+$ type), and the column was then washed successively with 450 ml. of water and with 3 l. of 0.05 N aqueous ammonia. The elution of the active substance was then made using 0.15 N aqueous ammonia. About 2.5 l. of the eluate obtained was evaporated to dryness under reduced pressure to yield 5.5 g. of a crude powder containing the SF–767–A and SF–767–L substances.

EXAMPLE 3

Two grams of the crude powder containing the SF–767–767 L substances as obtained in Example 2 were dissolved in 100 ml. of water, and the solution was adjusted to pH 7 with addition of hydrochloric acid. This solution was then passed downward through a column of 100 ml. of Amberlite CG 50 ($NH_4^+$ type), and the column of the resin was washed successively with 100 ml. of water and with 200 ml. of 0.05 N aqueous ammonia. The active substances were then eluted from the resin by passing 0.075 N aqueous ammonia through the column. The eluate was collected in fractions of each 18 ml. The fraction No. 103 to fraction No. 170 were combined together and concentrated to dryness by evaporating under reduced pressure, so that 1.01 g. of a white powder containing the SF–767–L substance was obtained. The SF–767–A substance was eluted at first in the fraction No. 230 and also in the subsequent fractions. The fraction No. 230 to fraction No. 409 were combined together and concentrated to dryness by evaporation under reduced pressure, so that 1.01 g. of a white powder containing the SF–767 A substance was obtained.

The white powder containing the SF–767–L substance (1.01 g.) was dissolved in 20 ml. of water and the solution was passed downward through a column of 18 ml. of Dowex 1 × 2 ($OH^-$ type), and the active substance was eluted from the column by developing with water. The eluate was collected in fractions of each 13 ml., and the fraction No. 2 to fraction No. 30 were combined together and concentrated to dryness by evaporation under reduced pressure. The free base of the SF–767–L substance was obtained at a yield of 770 mg.

The white powder containing the SF–767–A substance (1.01 g.) was similarly dissolved in 20 ml. of water and the solution was passed downward through a column of 20 ml. of Dowex 1 × 2 ($OH^-$ type). The active substance was eluted from the resin by developing with water. The eluate was collected in fraction of each 13 ml., and the fraction No. 3 to fraction No. 29 were combined together and concentrated to dryness by evaporation under reduced pressure. The free base of the SF-767-A substance was obtained at a yield of 700 mg.

EXAMPLE 4

A crude powder containing the SF-767-A substance (85 mg.) was dissolved in 5 ml. of water and the solution was adjusted to pH 7 with addition of diluted sulfuric acid. The solution was passed downward through a column of 10 ml. of active carbon suitable for chromatography (a product of Wako Junyaku Co., Japan). The development was then made using water. The eluate was collected in fraction of each 5 ml., and the fraction No. 3 to fraction No. 25 were combined together and concentrated to dryness of evaporation under reduced pressure. The SF-767-A substance sulfate was obtained at a yield of 70 mg.

EXAMPLE 5

A crude powder containing the SF-767-L substance (80 mg.) was dissolved in 5 ml. of water, and the solution was adjusted to pH 7 with addition of diluted sulfuric acid. This solution was passed downward through a column which was filled with 10 ml. of active carbon suitable for chromatography (a product of Wako Junyaku Co., Japan). The development was then made with water. The eluate was collected in fractions of each 5 ml., and the fraction No. 4 to fraction No. 30 were combined together and concentrated to dryness by evaporation under reduced pressure. The SF-767-L substance sulfate was obtained at a yield of 60 mg.

Figure 2:
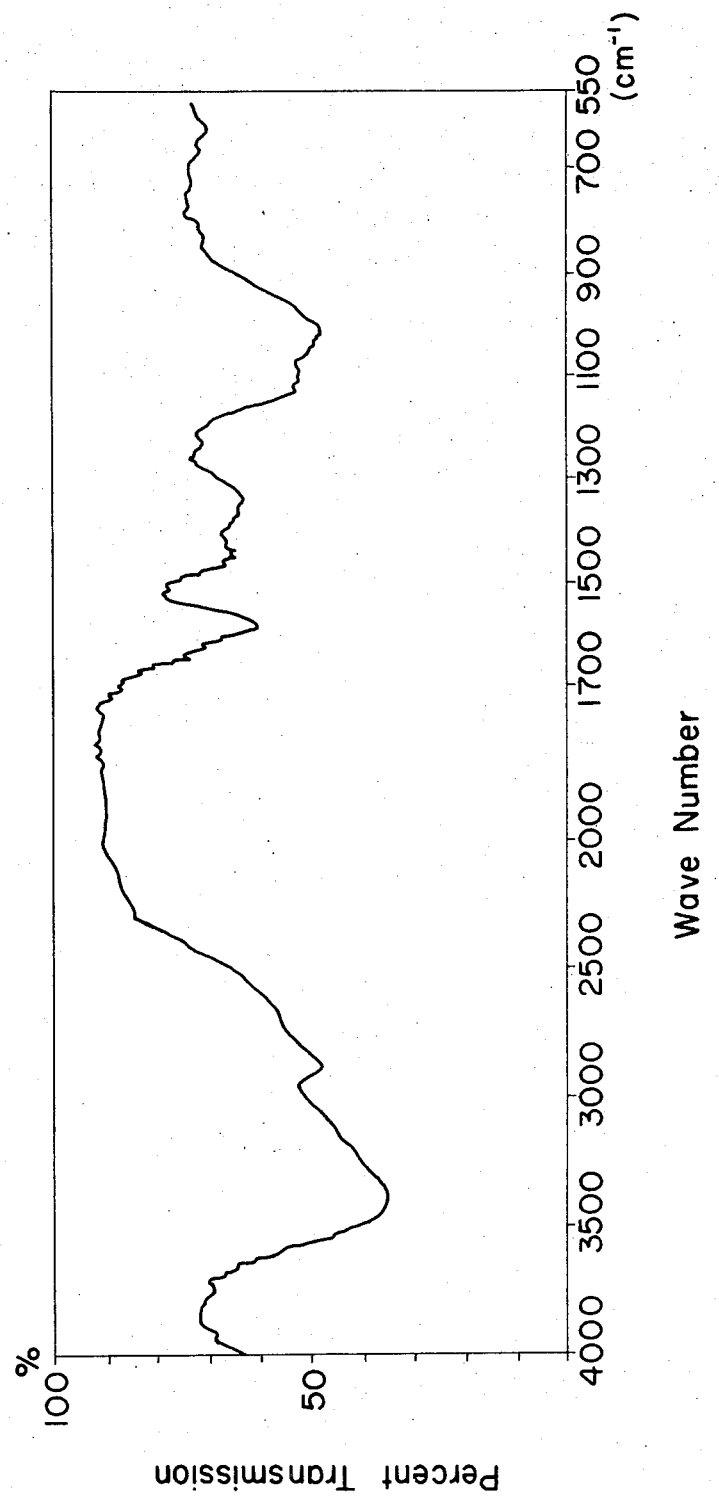
FIG. 2 shows a curve of the infra-red absorption spectrum of the SF–767–A substance pelleted in potassium bromide.
Figure 5:
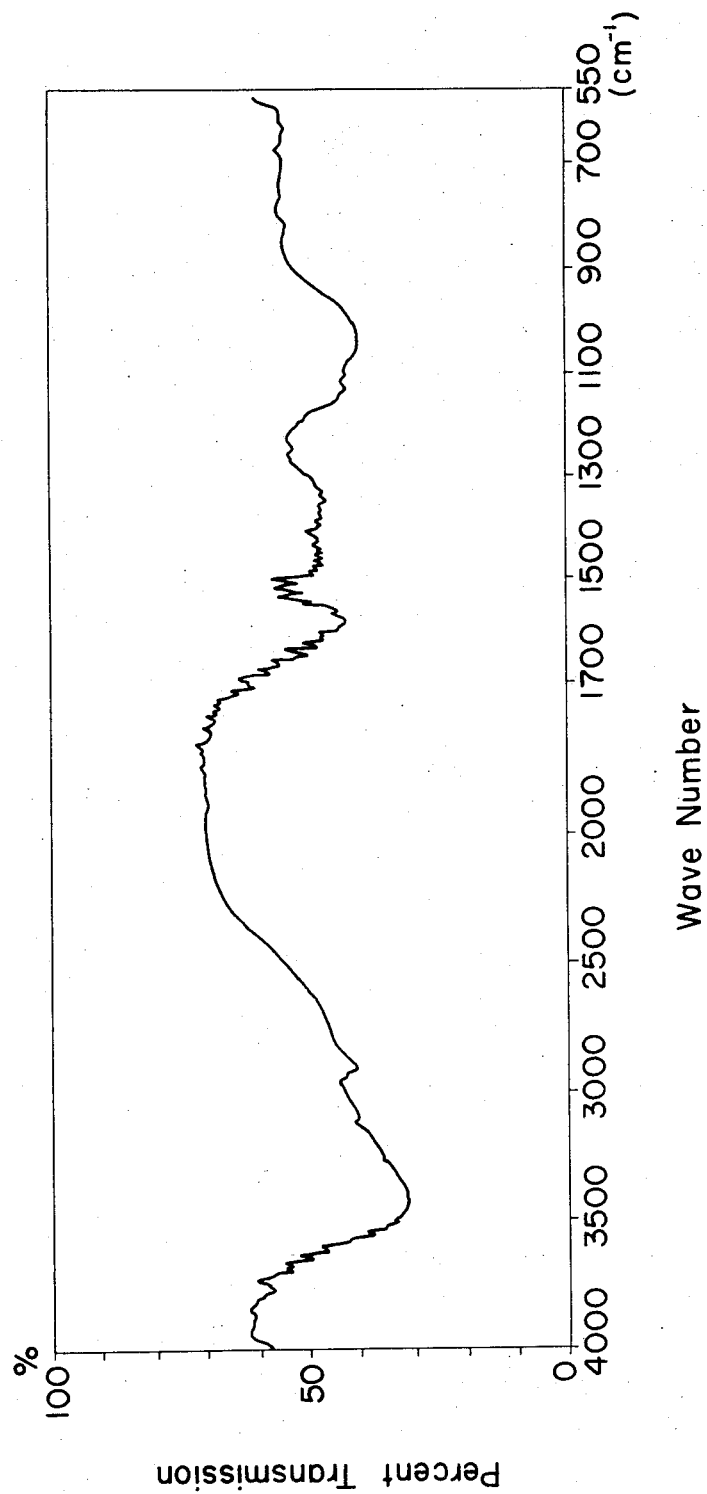
FIG. 5 shows a curve of the infra-red absorption spectrum of the SF–767–L substance pelleted in potassium bromide.

What we claim is:

1. An antibiotic substance effective in inhibiting the growth of Gram-positive, Gram-negative bacteria and acid-fast bacteria, selected from the group consisting of SF-767—767-L substance and acid salts thereof, each of the SF-767-A and SF-767-L substances being a substance which is soluble in water, sparingly to slightly soluble in methanol, and very slightly soluble to insoluble in ethanol, butanol, acetone, ethyl acetate, benzene, ethyl ether and n-hexane, which is basic and forms salts with acids, which exhibits no absorption maximum of ultraviolet light from 210 m $\mu$ to 360 m $\mu$, which gives a positive reaction to Molisch, anthrone and ninhydrin reagents but a negative reaction to Benedict, Fehling, Sakaguchi, ferric chloride, Elson-Morgan and maltol reagents, which contains only the elements carbon, hydrogen, nitrogen and oxygen, which contains amino group but no acidic group, which is dextro-rotatory in water, which gives a slightly alkaline solution in water wherein the molecules of the substance migrate toward the cathode at pH 1.8 when tested in paper electrophoresis, and which exhibits the characteristics of the aminoglycosidic antibiotics in the infra-red absorption spectrum; the further properties of the SF-767-A substance being that the SF-767-A substance free base forms a white colored amorphous powder showing no sharp melting point but decomposing in the vicinity of 190°C. with effervescence, gives an elementary analysis C 45.06%, H 7.40%, N 8.90% and O 39.08%, shows a molecular weight of 620 as determined by the vapor pressure equillibrium method in aqueous solution, hence has the empirical formula $C_{23}H_{44}N_4O_{14}$, exhibits an optical rotation of $[\alpha]_D^{25} + 67°$ in 1 percent aqueous solution and exhibits characteristic absorption bands in the infra-red region of spectrum when pelleted in the form of the free base in potassium bromide at the following wave numbers in cm$^{-1}$: 3,400, 2,900, 1,595, 1460, 1,350 1,130 (shoulder), and 1,010 as shown in FIG. 2; and the further properties of the SF-767-L substance being that the SF-767-L substance free base forms a white colored amorphous powder showing no sharp melting point but decomposing in the vicinity of 192°C. with effervescence, gives an elementary analysis: C 43.58%, H 6.80%, N 8.2% and O 40.75%, shows a molecular weight of 682 as determined by the vapor pressure equillibrium method in aqueous solution, hence has the empirical formula $C_{23}H_{46}N_4O_{16}$, exhibits an optical rotation of $[\alpha]_D^{25} + 60°$ in 1 percent aqueous solution and exhibits characteristic absorption bands in the infra-red region of spectrum when pelleted in the form of the free base in potassium bromide at the following wave numbers in cm$^{-1}$: 3,420, 2,910, 1,585, 1,480, 1,350, 1,130 (shoulder), and 1,010 as shown in FIG. 5.

2. The SF-767-A substance free base, as defined in claim 1.

3. An acid addition salt of the SF-767-A substance as defined in claim 1.

4. The SF-767-L substance free base as defined in claim 1.

5. An acid addition salt of the SF-767-L substance as defined in claim 1.

6. A process for the production of the SF-767-A substance and SF-767-L substance of claim 1, which comprises cultivating a strain of *Streptomyces microsporeus* identified as ATCC No. 21384 in culture medium containing assimilable nitrogen and carbon sources under aerobic conditions to produce and accumulate the SF-767-A substance and SF-767-L substance in the culture, and then recovering these antibiotic substances from the culture.

7. A process for the recovery and isolation of the SF-767—767-L substance of claim 1 which comprises cultivating a strain of *Streptomyces microsporeus* identified as ATCC No. 21384 in a culture medium containing assimilable nitrogen and carbon sources under aerobic conditions to produce and accumulate the SF-767-A and SF-767-L substances in the culture, adsorbing said substances onto a cation-exchange resin of the ammonium type, eluting this resin with aqueous ammonia, collecting the fractions of eluate containing the SF-767-A and SF-767-L substances, passing these active fractions through a column of another cation-exchange resin of the ammonium type to adsorb the active substances onto this resin, then again eluting the resin with aqueous ammonia, collecting the active fractions of eluate containing the SF-767-A and SF-767-L substances, concentrating these active fractions to dryness by evaporation under reduced pressure to yield a crude powder containing the SF-767-A and SF-767-L substances, dissolving this crude powder in water, passing the resulting aqueous solution through a column of a cation-resin of the ammonium type to adsorb the active substances onto the resin, eluting the SF-767-A substance-containing fractions and the SF-767-L substance-containing fractions separately from the column of the resin by development with aqueous ammonia, and then concentrating each of the SF-767-A substance-containing fractions and the SF-767-L substance-containing fractions to dryness by evaporation under reduced pressure.

* * * * *